(12) United States Patent
Tsai

(10) Patent No.: US 9,085,896 B2
(45) Date of Patent: Jul. 21, 2015

(54) ENERGY ABSORBER HAVING A CAPABILITY OF PREVENTING OPERATION TEMPERATURE FROM INCREASING

(71) Applicant: Chong-Shien Tsai, Taichung (TW)

(72) Inventor: Chong-Shien Tsai, Taichung (TW)

(*) Notice: Subject to any disclaimer, the term of this patent is extended or adjusted under 35 U.S.C. 154(b) by 133 days.

(21) Appl. No.: 13/686,056

(22) Filed: Nov. 27, 2012

(65) Prior Publication Data
US 2013/0334749 A1 Dec. 19, 2013

(30) Foreign Application Priority Data
Jun. 14, 2012 (TW) .............................. 101121315 A

(51) Int. Cl.
  *E04B 1/98* (2006.01)
  *E04H 9/02* (2006.01)
(52) U.S. Cl.
  CPC *E04B 1/98* (2013.01); *E04H 9/022* (2013.01); *Y02B 30/62* (2013.01)
(58) Field of Classification Search
  CPC ........... E04B 1/98; E04B 1/985; E04H 9/021; E04H 9/022; F16F 1/40
  USPC ........................... 267/292–294, 140.11, 140.4
  See application file for complete search history.

(56) References Cited

U.S. PATENT DOCUMENTS

| | | | | |
|---|---|---|---|---|
| 3,020,856 A * | 2/1962 | Hirst | .......................... | 105/198.1 |
| 3,134,585 A * | 5/1964 | Trask | ............................. | 267/153 |
| 4,713,917 A * | 12/1987 | Buckle et al. | ................ | 52/167.1 |
| 4,899,323 A * | 2/1990 | Fukahori et al. | .............. | 367/176 |
| 5,201,155 A * | 4/1993 | Shimoda et al. | ............. | 52/167.7 |
| 5,324,117 A * | 6/1994 | Matsushita et al. | ............. | 384/36 |
| 5,339,580 A * | 8/1994 | Koshika et al. | ............... | 52/167.1 |
| 5,465,945 A * | 11/1995 | Matsushita et al. | ........... | 267/294 |
| 5,655,756 A * | 8/1997 | Robinson | .................... | 267/140.2 |
| 5,761,856 A * | 6/1998 | Kishizono et al. | ........... | 52/167.8 |
| 5,765,322 A * | 6/1998 | Kubo et al. | .................. | 52/167.7 |
| 5,797,228 A * | 8/1998 | Kemeny | ....................... | 52/167.7 |
| 5,833,038 A * | 11/1998 | Sheiba | ......................... | 188/378 |
| 5,884,440 A * | 3/1999 | Kubo et al. | .................. | 52/167.1 |
| 6,235,400 B1 * | 5/2001 | Natsubori et al. | ............ | 428/468 |
| 7,565,774 B2 * | 7/2009 | Shizuku et al. | .............. | 52/167.1 |
| 7,856,766 B2 * | 12/2010 | Takenoshita et al. | ........ | 52/167.8 |
| 8,413,772 B2 * | 4/2013 | Wereley et al. | ............. | 188/267.2 |
| 8,668,968 B2 * | 3/2014 | Wakana et al. | .............. | 428/34.1 |
| 8,800,534 B2 * | 8/2014 | Kannan | ........................ | 123/469 |

FOREIGN PATENT DOCUMENTS

JP          53019657 A  *  2/1978

* cited by examiner

*Primary Examiner* — Anna Momper
(74) *Attorney, Agent, or Firm* — Bacon & Thomas, PLLC

(57) ABSTRACT

An energy absorber has at least one hollow core post filled with coolant, two supporting boards, multiple first material layers and second material layers. The supporting boards are mounted respectively on two ends of the at least one hollow core post. The first material layers and second material layers are alternately mounted between the supporting boards. Accordingly, the operation temperature of the energy absorber can be prevented from increasing by the coolant in the core post.

42 Claims, 12 Drawing Sheets

ENERGY ABSORBER HAVING A CAPABILITY OF PREVENTING OPERATION TEMPERATURE FROM INCREASING

BACKGROUND OF THE INVENTION

1. Field of the Invention

The present invention relates to an energy absorber, and more particularly to an energy absorber to absorb earthquake shock energy and having a capability of preventing operation temperature of the energy absorber from increasing.

2. Description of Related Art

Energy absorbers are commonly mounted on large objects, such as buildings, bridges or machines to provide shock-absorbing and shock-suppressing effects to the objects and to absorb the energy and shocks generated during earthquakes. U.S. Pat. No. 5,655,756 discloses a conventional energy absorber comprises a core, two connector plates and multiple rubber and steel layers. The connector plates are mounted respectively on two ends of the core and are securely connected to the ground and a large object respectively. The rubber layers and the steel layers are alternately mounted between the connector plates. When an earthquake occurs, a shock-absorbing effect can be provided by the deformations of the rubber and steel layers.

However, the core of the energy absorber of the '756 Patent is made of lead. The lead core may be deformed during the earthquake, and the deformation of the lead core will generate heat. Therefore, the temperature of the core of the '756 Patent will rise to about 300° C. which approaches the melting point of lead, about 327° C., and the high temperature easily causes the melting of the core. Furthermore, the rubber layers and the structure of the conventional energy absorber are easily damaged in the overheating event. In addition, the high temperature also easily decreases the structural strength of the energy absorber, such that the shock-absorbing effect of the conventional energy absorber is also reduced.

To overcome the shortcomings, the present invention tends to provide an energy absorber to mitigate or obviate the aforementioned problems.

SUMMARY OF THE INVENTION

The main objective of the invention is to provide an energy absorber having a capability of preventing the operation temperature of the energy absorber from increasing.

The energy absorber has at least one hollow core post filled with coolant, two supporting boards, multiple first material layers and multiple second material layers. The supporting boards are mounted respectively on two ends of the at least one hollow core post. The first material layers and second material layers are alternately mounted between the supporting boards.

Other objects, advantages and novel features of the invention will become more apparent from the following detailed description when taken in conjunction with the accompanying drawings.

DETAILED DESCRIPTION OF PREFERRED EMBODIMENT

Figure 1:
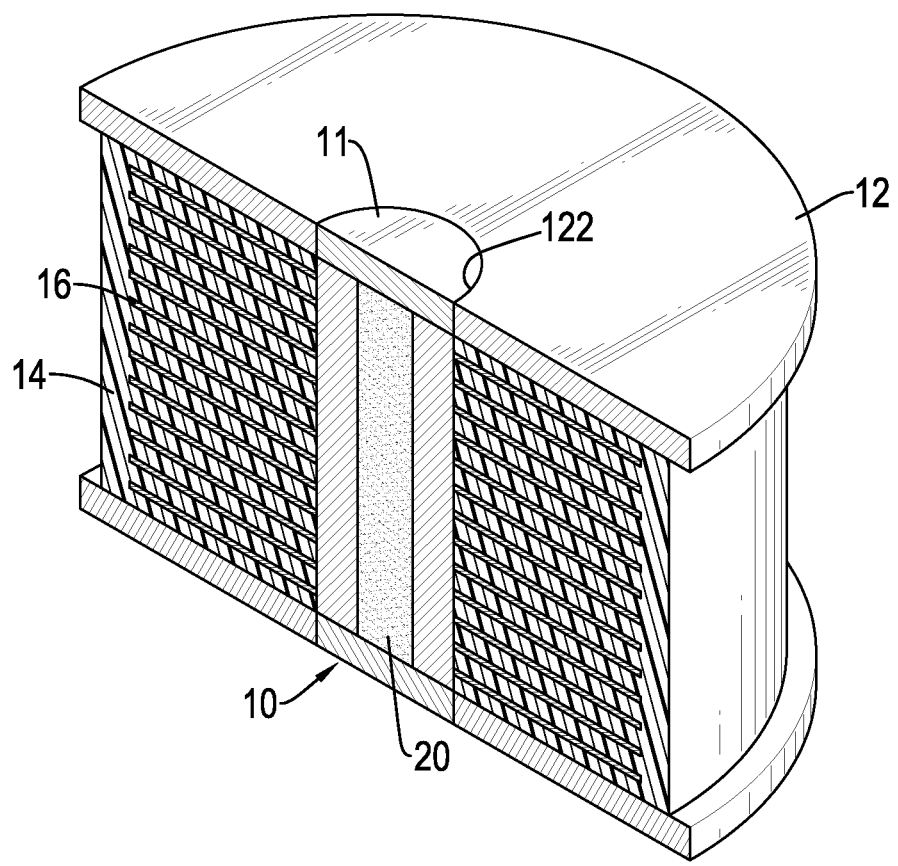
FIG. 1 is a perspective view in partial section of a first embodiment of an energy absorber in accordance with the present invention.
Figure 2:
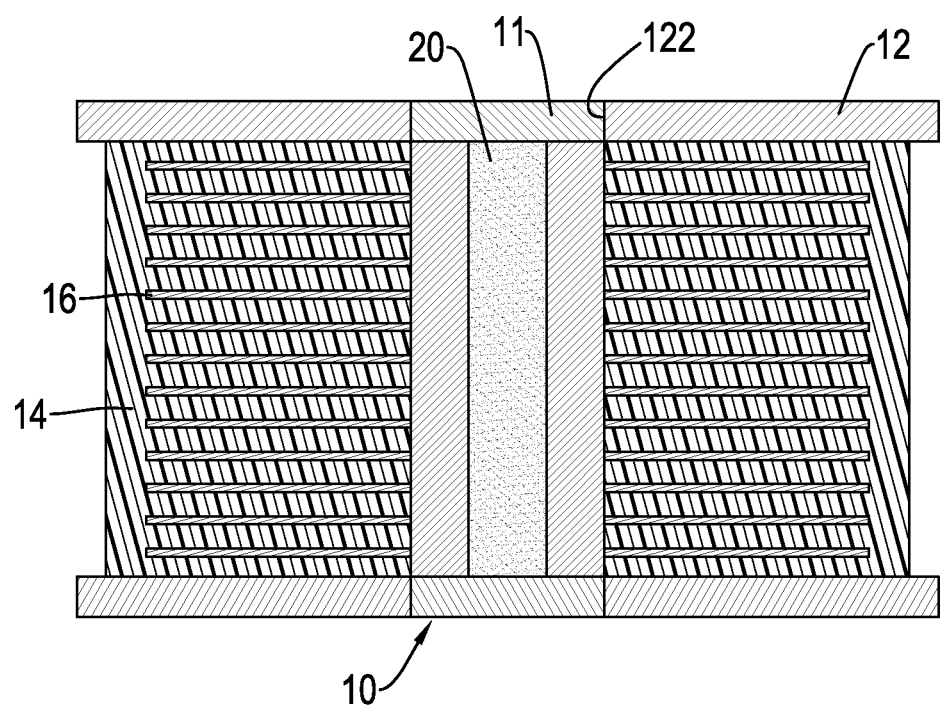
FIG. 2 is a cross sectional side view of the energy absorber in FIG. 1.
Figure 3:
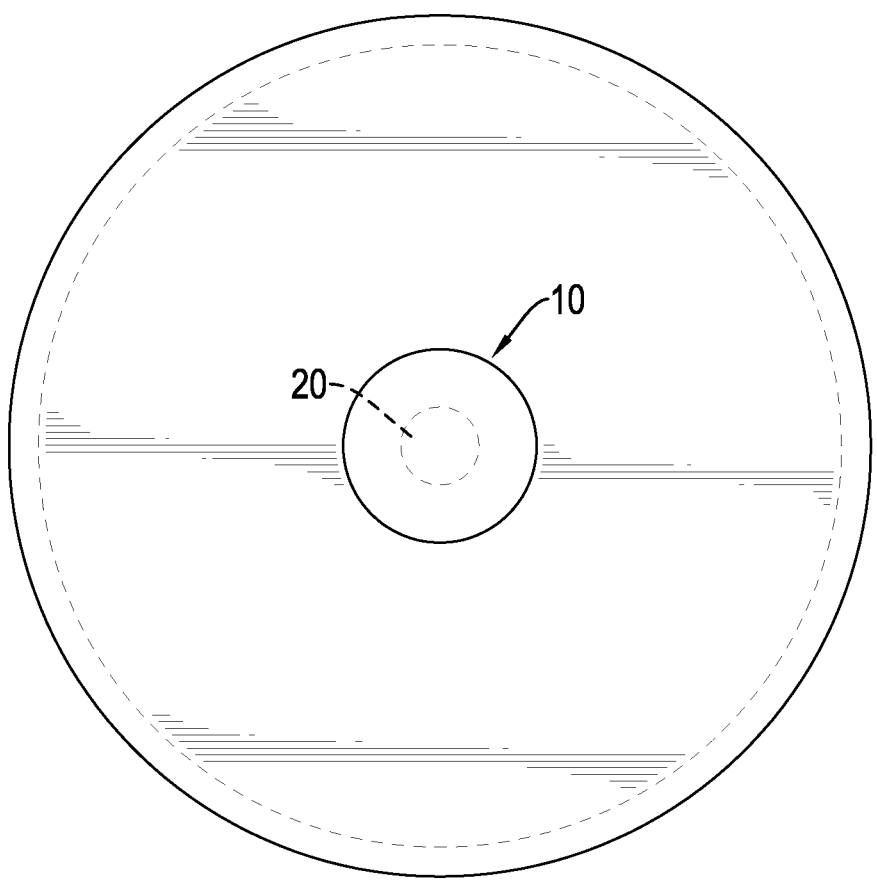
FIG. 3 is a top view of the energy absorber in FIG. 1.

With reference to FIGS. 1 to 3, an energy absorber in accordance with the present invention comprises a core post 10, two supporting boards 12, multiple first material layers 14 and multiple second material layers 16. The core post 10 is hollow and may have two opened ends and a round, square, rectangular or any possible shaped cross section. The core post 10 may be made of flexible metal, such as lead, iron, steel or aluminum and is filled with coolant 20. The coolant 20 may be water or another suitable cooling agent. Two covers 11 are respectively mounted on and close the opened ends of the core post 10.

Each supporting board 12 may be round, square and any possible shaped and are securely and respectively connected to the ground and a large object, such as a building, a bridge or a machine. Each supporting board 12 has a receiving hole 122 defined through the center of the supporting board 12 and corresponding to and receiving one of the ends of the core post 10 or the corresponding cover 11 inside. The first material layers 14 and second material layers 16 are alternately mounted between the supporting boards 12 and surround the core post 10. The first material layers 14 and the second material layers 16 have a shape corresponding to that of the supporting boards 12 and may be round, square and any possible shape. Alternatively, the first material layers 14 and the second material layers 16 have a shape different from that of the supporting boards 12. For example, the supporting board 12 may be square, and the first material layers 14 and the second material layers 16 may be round. The first material layers 14 and the second material layers 16 are made of flexible materials that are different from each other. The first material layers 14 may be rubber or metal. The second material layers 16 may be metal, rubber or carbon fibers.

With such an energy absorber in accordance with the present invention, the earthquake shock and energy can be efficiently absorbed and suppressed by the deformation of the core post 10 and the first and second material layers 14,16, and the earthquake shock and energy can be kept from being transmitted to the object directly. Thus, an excellent shock-absorbing effect is provided to the object to prevent the object from being damaged by earthquakes.

Due to the coolant 20 deposited in the hollow core post 10, the operation temperatures of the core post 10 and the entire energy absorber can be efficiently cooled down, and the core post 10 and the first and second material layers 14,16 can be prevented from becoming damaged. The structural strength and the shock-absorbing effect of the energy absorber in accordance with the present invention can be maintained.

Figure 4:
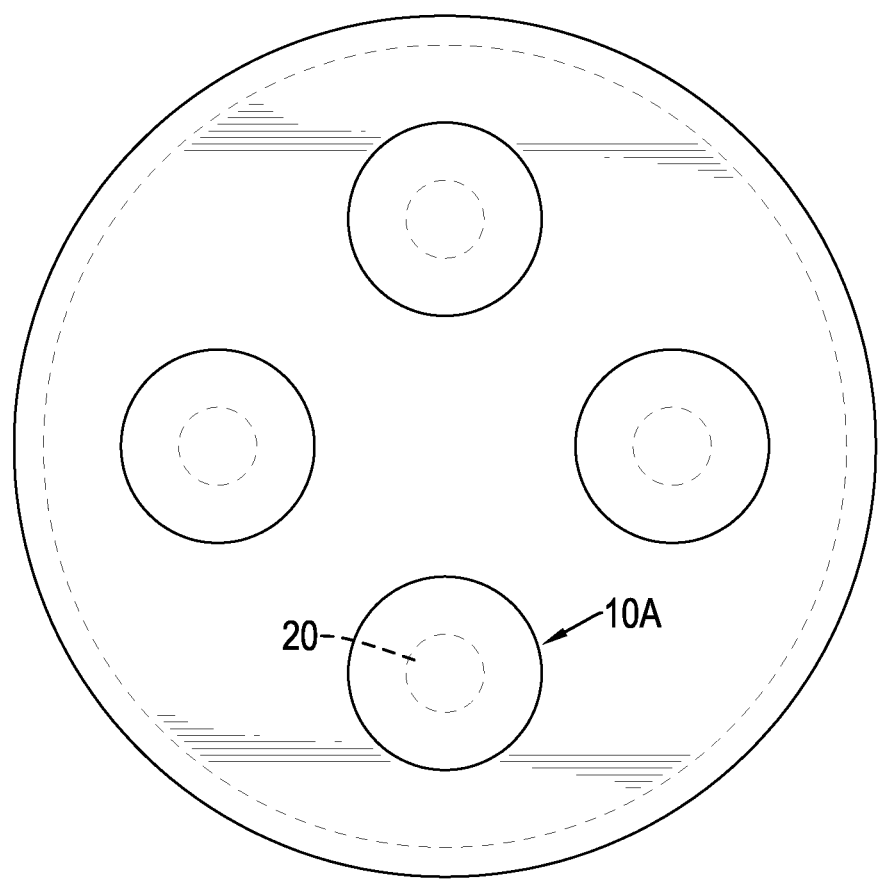
FIG. 4 is a top view of a second embodiment of an energy absorber in accordance with the present invention.

With reference to FIG. 4, in the second embodiment, multiple core posts 10A are implemented and are arranged at even intervals and in a circle having a center at the center of the energy absorber. With the coolant 20 in the multiple core posts 10A, the cooling effect of the entire energy absorber is enhanced.

Figure 5:
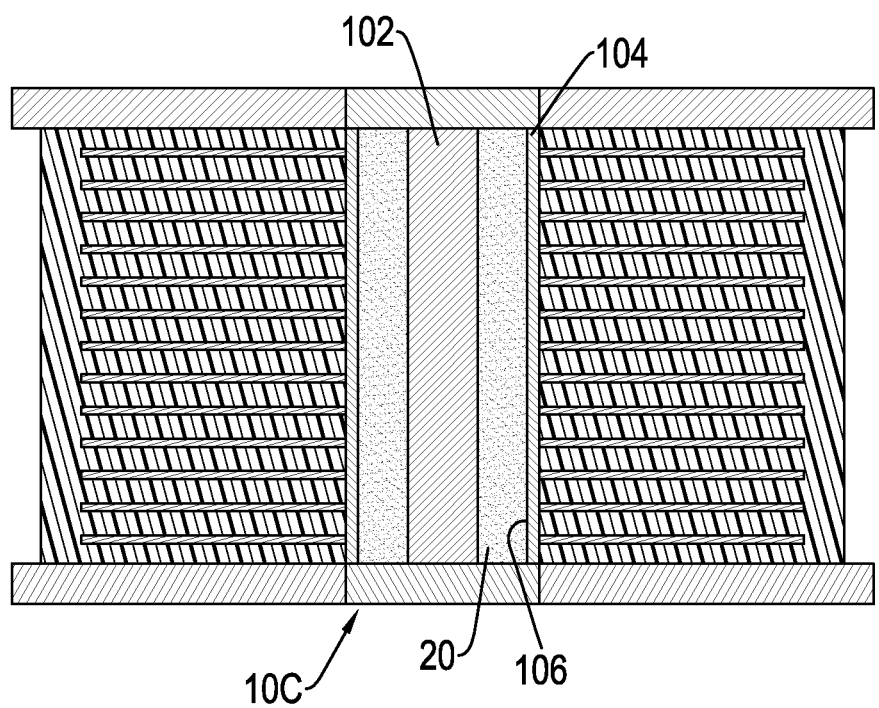
FIG. 5 is a cross sectional side view of a third embodiment of an energy absorber in accordance with the present invention.
Figure 6:
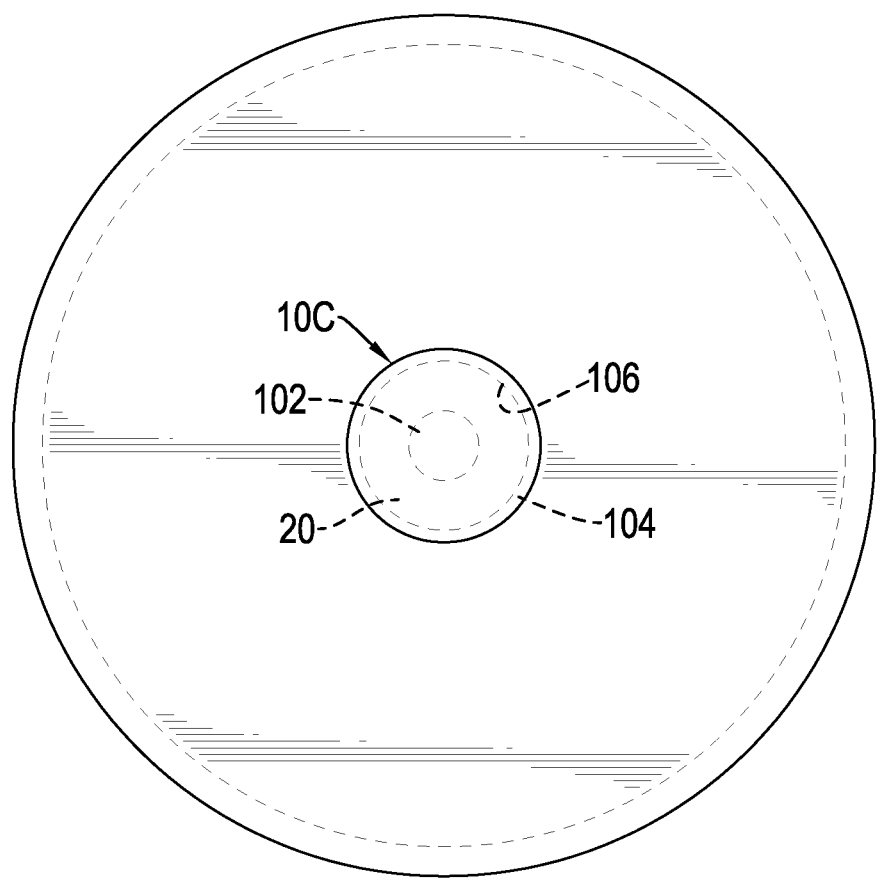
FIG. 6 is a top view of the energy absorber in FIG. 5.

With reference to FIGS. 5 and 6, in the third embodiment, a single one core post 10C is implemented and comprises a solid post body 102 and a housing 104 separately enclosing the post body 102 to form a space 106 between the post body 102 and the housing 104 and filled with the coolant 20.

Figure 7:
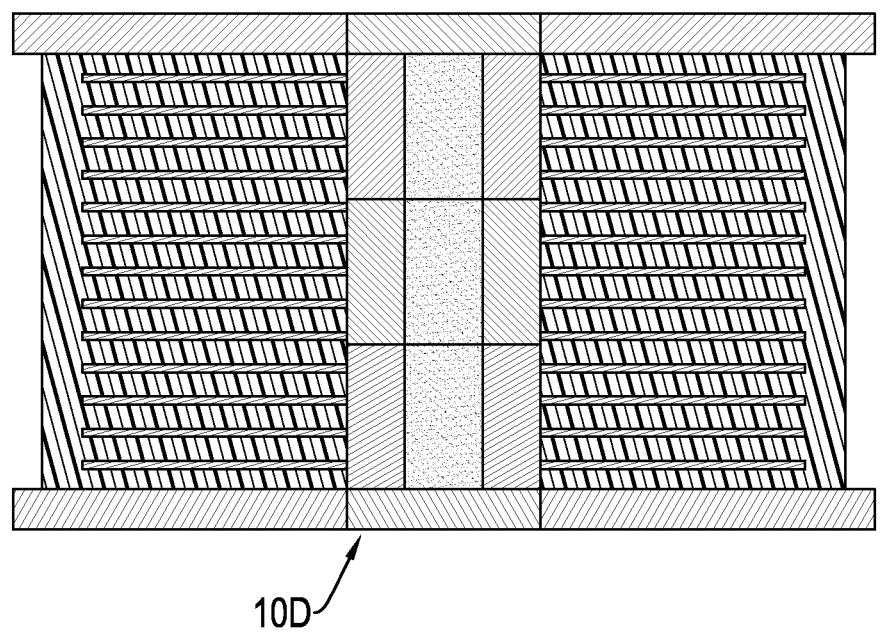
FIG. 7 is a cross sectional side view of a fourth embodiment of an energy absorber in accordance with the present invention.

With reference to FIG. 7, in the fourth embodiment, the core post 10D is composed of multiple body elements, and the body elements are made of a same material or different materials. With the body elements made of different materials, the core post 10D has different flexibilities and deformations in the body elements.

Figure 8:
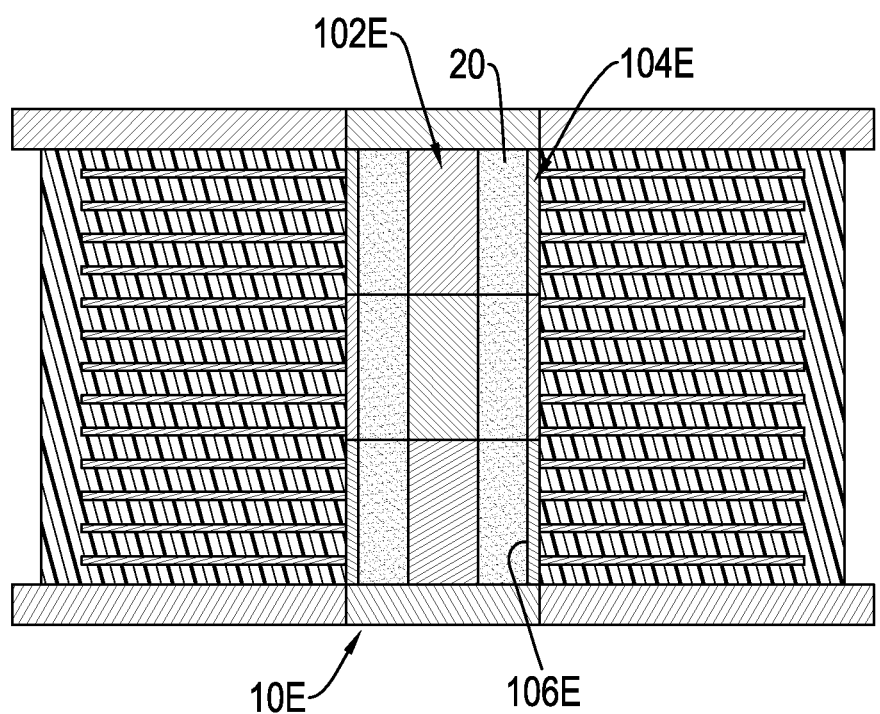
FIG. 8 is a cross sectional side view of a fifth embodiment of an energy absorber in accordance with the present invention.
Figure 9:
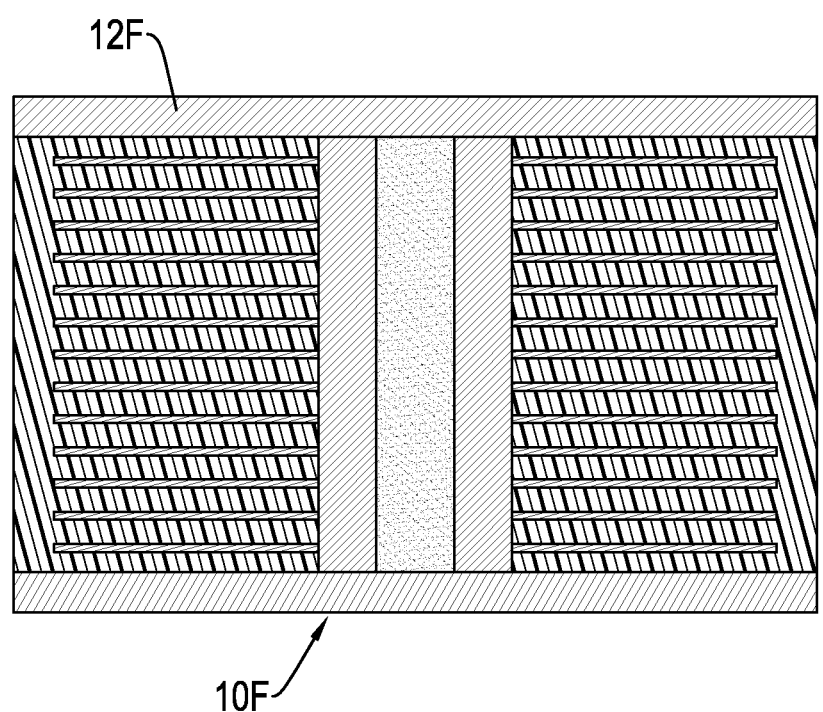
FIG. 9 is a cross sectional side view of a sixth embodiment of an energy absorber in accordance with the present invention.
Figure 10:
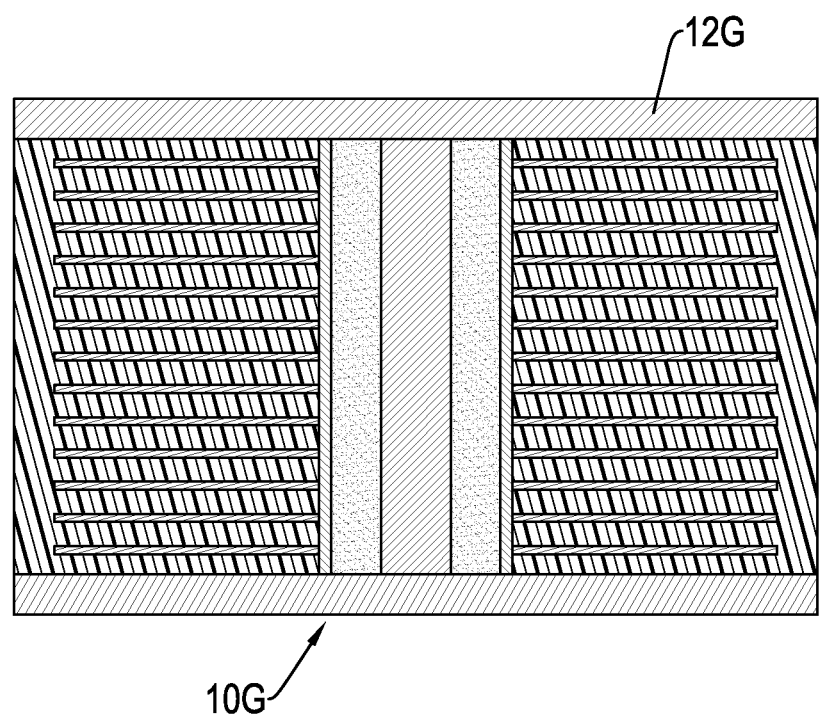
FIG. 10 is a cross sectional side view of a seventh embodiment of an energy absorber in accordance with the present invention.
Figure 11:
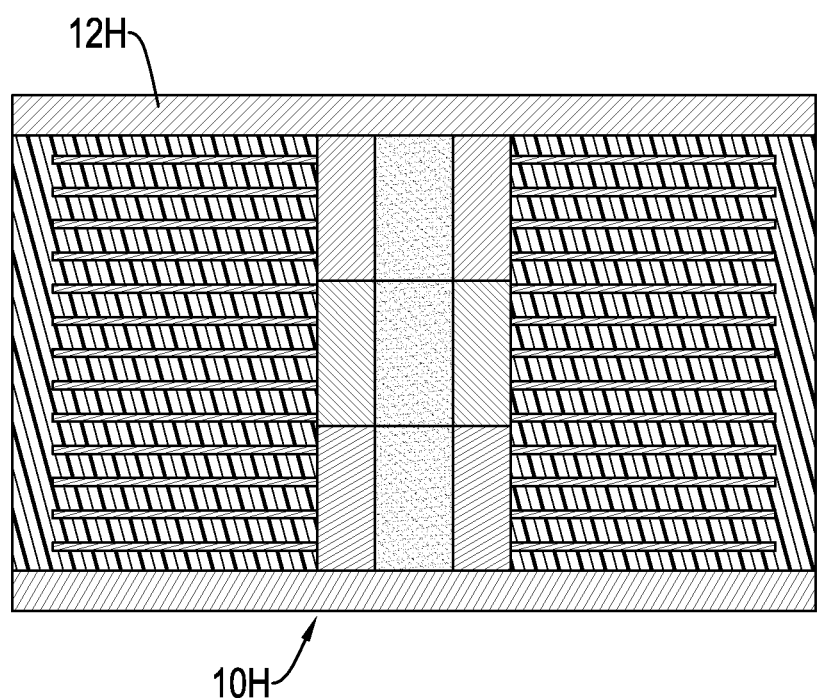
FIG. 11 is a cross sectional side view of an eighth embodiment of an energy absorber in accordance with the present invention.
Figure 12:
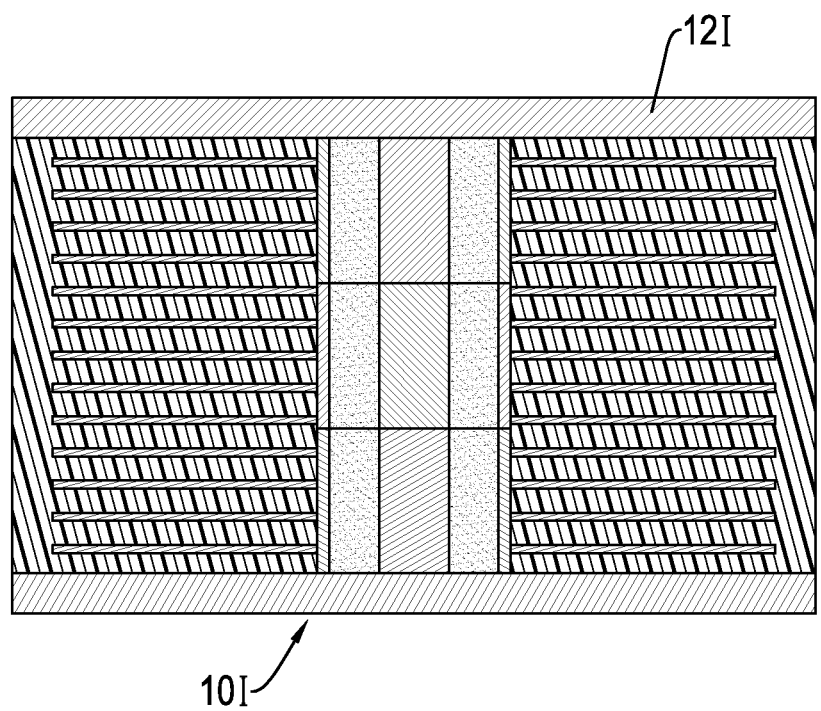
FIG. 12 is a cross sectional side view of a ninth embodiment of an energy absorber in accordance with the present invention.

With reference to FIG. 8, in the fifth embodiment, the core post 10E comprises a solid post body 102E and a housing 104E separately enclosing the post body 102E to form a space 106E between the post body 102E and the housing 104E and filled with the coolant 20. The post body 102E is composed of multiple body elements, and the housing 104E is composed of multiple housing elements. The body elements and the housing elements can be made of a same material or different materials to provide different flexibilities and deformations at different positions of the core post 10E.

With reference to FIGS. 9 to 12, in the sixth to the ninth embodiments in accordance with the present invention, the supporting boards 12F,12G,12H,12I are attached to and close the opened ends of the at least one core post 10F,10G,10H,10I respectively. Each core post 10F,10G,10H,10I may be an integral hollow post, may comprise a solid post body and a housing or may be composed of multiple body elements and housing elements.

Furthermore, in the embodiments shown in FIGS. 5 to 12, multiple core posts 10C to 10I may be implemented to fit with different needs and designs.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An energy absorber comprising:
   at least one hollow core post being deformable, made of flexible metal to absorb earthquake shock and energy and filled with coolant having a capability of preventing operation temperature of the energy absorber raised due to the deformation of the core post from increasing;
   two supporting boards mounted respectively on two ends of the at least one hollow core post; and
   multiple first material layers and multiple second material layers alternately mounted between the supporting boards, surrounding the at least one core post and being deformable to absorb earthquake shock and energy.

2. The energy absorber as claimed in claim 1, wherein a single one core post is implemented.

3. The energy absorber as claimed in claim 2, wherein the core post comprises a solid post body and a housing separately enclosing the post body to form a space filled with the coolant.

4. The energy absorber as claimed in claim 3, wherein the post body of the core post is composed of multiple body elements; and
   the housing of the core post is composed of multiple housing elements.

5. The energy absorber as claimed in claim 4, wherein the body elements of the post body of the core post are made of different materials; and
   the housing elements of the housing of the core post are made of different materials.

6. The energy absorber as claimed in claim 4, wherein the core post has two opened ends and two covers mounted on and closing the opened ends of the core post respectively; and
   each supporting board has a receiving hole defined through the supporting board and holding a corresponding one of the covers of the core post inside.

7. The energy absorber as claimed in claim 4, wherein the core post has two opened ends and two covers mounted on and closing the opened ends of the core post respectively; and
   the supporting boards are attached to and close the opened ends of the core post respectively.

8. The energy absorber as claimed in claim 3, wherein the core post has two opened ends and two covers mounted on and closing the opened ends of the core post respectively; and
   each supporting board has a receiving hole defined through the supporting board and holding a corresponding one of the covers of the core post inside.

9. The energy absorber as claimed in claim 3, wherein the core post has two opened ends and two covers mounted on and closing the opened ends of the core post respectively; and
   the supporting boards are attached to and close the opened ends of the core post respectively.

10. The energy absorber as claimed in claim 2, wherein
    the core post has two opened ends and two covers mounted on and closing the opened ends of the core post respectively; and
    each supporting board has a receiving hole defined through the supporting board and holding a corresponding one of the covers of the core post inside.

11. The energy absorber as claimed in claim 2, wherein the core post has two opened ends and two covers mounted on and closing the opened ends of the core post respectively; and
    the supporting boards are attached to and close the opened ends of the core post respectively.

12. The energy absorber as claimed in claim 2, wherein the core post is composed of multiple body elements.

13. The energy absorber as claimed in claim 12, wherein the body elements of the core post are made of different materials.

14. The energy absorber as claimed in claim 12, wherein the core post has two opened ends and two covers mounted on and closing the opened ends of the core post respectively; and
    each supporting board has a receiving hole defined through the supporting board and holding a corresponding one of the covers of the core post inside.

15. The energy absorber as claimed in claim 12, wherein the core post has two opened ends and two covers mounted on and closing the opened ends of the core post respectively; and the supporting boards are attached to and close the opened ends of the core post respectively.

16. The energy absorber as claimed in claim 1, wherein multiple core posts are implemented.

17. The energy absorber as claimed in claim 16, wherein each core post comprises a solid post body and a housing separately enclosing the post body to form a space filled with the coolant.

18. The energy absorber as claimed in claim 17, wherein the post body of each core post is composed of multiple body elements; and
    the housing of each core post is composed of multiple housing elements.

19. The energy absorber as claimed in claim 18, wherein the body elements of the post body of each core post are made of different materials; and
    the housing elements of the housing of each core post are made of different materials.

20. The energy absorber as claimed in claim 18, wherein each core post has two opened ends and two covers mounted on and closing the opened ends of the core post respectively; and
    each supporting board has multiple receiving holes defined through the supporting board and each receiving hole holding one of the covers of a corresponding one of the core posts inside.

21. The energy absorber as claimed in claim 18, wherein each core post has two opened ends and two covers mounted on and closing the opened ends of the core post respectively; and
    the supporting boards are attached to and close the opened ends of the core posts respectively.

22. The energy absorber as claimed in claim 17, wherein each core post has two opened ends and two covers mounted on and closing the opened ends of the core post respectively; and
    each supporting board has multiple receiving holes defined through the supporting board and each receiving hole holding one of the covers of a corresponding one of the core posts inside.

23. The energy absorber as claimed in claim 17, wherein each core post has two opened ends and two covers mounted on and closing the opened ends of the core post respectively; and
    the supporting boards are attached to and close the opened ends of the core posts respectively.

24. The energy absorber as claimed in claim 16, wherein each core post has two opened ends and two covers mounted on and closing the opened ends of the core post respectively; and
    each supporting board has multiple receiving holes defined through the supporting board and each receiving hole holding one of the covers of a corresponding one of the core posts inside.

25. The energy absorber as claimed in claim 16, wherein each core post has two opened ends and two covers mounted on and closing the opened ends of the core post respectively; and
    the supporting boards are attached to and close the opened ends of the core posts respectively.

26. The energy absorber as claimed in claim 16, wherein each core post is composed of multiple body elements.

27. The energy absorber as claimed in claim 26, wherein the body elements of each core post are made of different materials.

28. The energy absorber as claimed in claim 26, wherein each core post has two opened ends and two covers mounted on and closing the opened ends of the core post respectively; and
    each supporting board has multiple receiving holes defined through the supporting board and each receiving hole holding one of the covers of a corresponding one of the core posts inside.

29. The energy absorber as claimed in claim 26, wherein each core post has two opened ends and two covers mounted on and closing the opened ends of the core post respectively; and
    the supporting boards are attached to and close the opened ends of the core posts respectively.

30. The energy absorber as claimed in claim 1, wherein each one of the at least one core post comprises a solid post body and a housing separately enclosing the post body to form a space filled with the coolant.

31. The energy absorber as claimed in claim 30, wherein the post body of each one of the at least one core post is composed of multiple body elements; and
    the housing of each one of the at least one core post is composed of multiple housing elements.

32. The energy absorber as claimed in claim 31, wherein the body elements of the post body of each one of the at least one core post are made of different materials; and
    the housing elements of the housing of each one of the at least one core post are made of different materials.

33. The energy absorber as claimed in claim 31, wherein each one of the at least one core post has two opened ends and two covers mounted on and closing the opened ends of the core post respectively; and
    each supporting board has at least one receiving hole defined through the supporting board and each one of the at least one receiving hole holding one of the covers of a corresponding one of the at least one core post inside.

34. The energy absorber as claimed in claim 21, wherein each one of the at least one core post has two opened ends and two covers mounted on and closing the opened ends of the core post respectively; and
    the supporting boards are attached to and close the opened ends of the at least one core post respectively.

35. The energy absorber as claimed in claim 30, wherein each one of the at least one core post has two opened ends and two covers mounted on and closing the opened ends of the core post respectively; and
    each supporting board has at least one receiving hole defined through the supporting board and each one of the at least one receiving hole holding one of the covers of a corresponding one of the at least one core post inside.

36. The energy absorber as claimed in claim 30, wherein each one of the at least one core post has two opened ends and two covers mounted on and closing the opened ends of the core post respectively; and
    the supporting boards are attached to and close the opened ends of the at least one core post respectively.

37. The energy absorber as claimed in claim 1, wherein each one of the at least one core post has two opened ends and two covers mounted on and closing the opened ends of the core post respectively; and
    each supporting board has at least one receiving hole defined through the supporting board and each one of the at least one receiving hole holding one of the covers of a corresponding one of the at least one core post inside.

38. The energy absorber as claimed in claim 1, wherein each one of the at least one core post has two opened ends and two covers mounted on and closing the opened ends of the core post respectively; and the supporting boards are attached to and close the opened ends of the at least one core post respectively.

39. The energy absorber as claimed in claim 1, wherein each one of the at least one core post is composed of multiple body elements.

40. The energy absorber as claimed in claim 39, wherein the body elements of each one of the at least one core post are made of different materials.

41. The energy absorber as claimed in claim 39, wherein each one of the at least one core post has two opened ends and two covers mounted on and closing the opened ends of the core post respectively; and each supporting board has at least one receiving hole defined through the supporting board and each one of the at least one receiving hole holding one of the covers of a corresponding one of the at least one core post inside.

42. The energy absorber as claimed in claim 39, wherein each one of the at least one core post has two opened ends and two covers mounted on and closing the opened ends of the core post respectively; and the supporting boards are attached to and close the opened ends of the at least one core post respectively.

\* \* \* \* \*